United States Patent
Rosenthal et al.

(10) Patent No.: US 6,822,884 B1
(45) Date of Patent: Nov. 23, 2004

(54) PULSE WIDTH MODULATED CHARGE PUMP

(75) Inventors: Bruce Rosenthal, Los Gatos, CA (US); Richard L. Gray, Saratoga, CA (US)

(73) Assignee: Analog Microelectronics, Inc., Santa Clara, CA (US)

( * ) Notice: Subject to any disclaimer, the term of this patent is extended or adjusted under 35 U.S.C. 154(b) by 49 days.

(21) Appl. No.: 10/444,815

(22) Filed: May 22, 2003

(51) Int. Cl.[7] ............................................. H02M 3/18
(52) U.S. Cl. ................................................... 363/59
(58) Field of Search ............................... 363/59, 60, 62; 327/535, 536

(56) References Cited

U.S. PATENT DOCUMENTS

| | | | |
|---|---|---|---|
| 4,733,159 A | * | 3/1988 | Edwards et al. ............ 323/282 |
| 5,051,882 A | * | 9/1991 | Grimm et al. ................ 363/60 |
| 5,245,524 A | | 9/1993 | Nakagawa et al. |
| 5,680,300 A | | 10/1997 | Szepesi et al. |
| 6,445,623 B1 | * | 9/2002 | Zhang et al. .......... 365/189.11 |

* cited by examiner

Primary Examiner—Matthew V. Nguyen
(74) Attorney, Agent, or Firm—Bever, Hoffman & Harms, LLP; Jeanette S. Harms

(57) ABSTRACT

A charge pump system and method including a charge pump and a pulse width modulated (PWM) controller are provided. The charge pump includes a pump capacitor, a reservoir capacitor, and pump circuitry. During a first phase, the pump circuit couples the pump capacitor between a first supply voltage and a second supply voltage. During a second phase, the pump circuit couples the pump capacitor and the reservoir capacitor in series between the first supply voltage and an output terminal of the charge pump system. The PWM controller, which is coupled to the pump circuitry, determines the phase of the charge pump.

16 Claims, 18 Drawing Sheets

US 6,822,884 B1

PULSE WIDTH MODULATED CHARGE PUMP

BACKGROUND OF THE INVENTION

1. Field of the Invention

The invention relates to a regulated charge pump, and particularly to a pulse width modulated charge pump.

2. Discussion of the Related Art

Charge pumps are well known in the art. For example, FIG. 1A illustrates a simplified charge pump 100 including an oscillator 101 that connects switch 104 to the ground GND terminal and switch 105 to the input voltage VIN terminal during the first half of a clock cycle. In this configuration, capacitor 102 (i.e. a pump capacitor) is charged to the input voltage VIN, whereas capacitor 103 (connected only to ground) is not charged. During the second half of the clock cycle, oscillator 101 connects switch 104 to the input voltage VIN terminal and switch 105 to the output voltage VOUT terminal. In this configuration, with the negative terminal of capacitor 102 connected to the input voltage VIN terminal, its positive terminal is increased to twice the source voltage. In this manner, capacitor 103 (i.e. a reservoir capacitor) is then charged to twice the input voltage. In this manner, charge pump 100 can produce an output voltage of 2VIN.

Although charge pump 100 is relatively easy to implement, its output voltage can undesirably drop when subjected to a load and can vary with its input voltage VIN. Moreover, some applications may require a voltage higher than the input voltage, but less than double. For example, a system may provide an input voltage of 3.3V, but need only 5.0V. FIG. 1B illustrates a known, modified charge pump 110 that could be used to address these issues. Specifically, charge pump 110, in addition to the components described in detail in reference to FIG. 1A, also includes a standard linear regulator 111 that can be used to regulate down the generated 2VIN to a specific intermediate output voltage.

Both charge pumps 100 and 110 require a system capable of handling the multiplied output voltage, e.g. 2VIN. Thus, special circuits may be needed to protect low-voltage transistors/devices from this multiplied output voltage. Additionally, linear regulator 111 in charge pump 110 requires significant silicon area for implementation, thereby undesirably increasing system cost.

FIG. 2 illustrates one example of a continuously modulating regulator 206 that includes a comparator 201 for responding to the difference between the output voltage 202 of a charge pump 200 and a reference voltage 203. Comparator 201 forms part of an analog feedback loop that can control the charging of a pump capacitor 204, which in turn can control the charging of a reservoir capacitor 205. U.S. Pat. No. 5,680,300 describes this regulator in further detail. Unfortunately, regulator 206 provides a poor efficiency and undesirably increases the IC topology by using large n-channel devices.

Alternatively, replacing either the linear regulator or the continuously modulating regulator, a burst mode regulator for a charge pump can turn a clock on and off as needed (wherein, when the clock is on it runs at a fixed frequency) to bring the output voltage to the desired voltage level. One known charge pump providing such burst functionality is the MAX1682 device sold by Maxim, Inc. However, turning on and off the clock can cause some inter-modulation problems with other circuits on the board. For example, inter-modulation could cause an error signal or an undesirable feedback signal (such as an audible sound in a cell phone application).

Therefore, a need arises for a charge pump that provides an intermediate output voltage without requiring significant silicon area or causing inter-modulation problems.

SUMMARY OF THE INVENTION

A charge pump system and method including a charge pump and a pulse width modulated controller are provided. The charge pump includes a pump capacitor, a reservoir capacitor, and pump circuitry. During a first phase, the pump circuit couples the pump capacitor between a first supply voltage and a second supply voltage. During a second phase, the pump circuit couples the pump capacitor and the reservoir capacitor in series between the first supply voltage and an output terminal of the charge pump system. The PWM controller, which is coupled to the pump circuitry, determines the phase of the charge pump.

In one embodiment, the pump circuitry includes a feedback loop to the PWM controller, and the PWM controller includes an error amplifier that compares a voltage on the feedback loop to a reference voltage. The PWM controller can further include a comparator for receiving an output of the error amplifier and a ramping signal, thereby generating a PWM signal. A multiplexing circuit can select the PWM signal or a switching signal, wherein the output of the multiplexing circuit determines the phase of the charge pump. Specifically, this output determines a first time associated with the first phase and a second time associated with the second phase. In a preferred embodiment, the charge pump provides "break before make" switching, thereby preventing inadvertent discharge of the pump capacitor in the first phase.

A circuit and method for selectively isolating a first line from a second line are also provided. The circuit can include first, second, and third transistors. The first transistor has a first control terminal, a first current-carrying terminal, a second current-carrying terminal, and a first body. The second transistor has a second control terminal, a second source, a second drain, and a second body, wherein the second source is connected to the first current-carrying terminal and the first line. The third transistor has a third control terminal, a third current-carrying terminal, a third current-carrying terminal, and a third body, wherein the third source is connected to the second current-carrying terminal and the second line, the third drain is connected to the second drain, and the first, second, and third bodies are connected to the second drain.

The isolating circuit further includes control circuitry coupled to the first, second, and third control terminals. During a first phase, in which a first voltage on the first line is greater than a second voltage on the second line, the first and third transistors are turned off, the second transistor is turned on, and the first current-carrying terminal functions as a source. During a second phase, in which the second voltage on the second line is greater than the first voltage on the first line, the first and third transistors are turned on, the second transistor is turned off, and the second current-carrying terminal functions as a source.

DETAILED DESCRIPTION OF THE FIGURES

In accordance with one feature of the invention, pulse width modulation (PWM) can be used to adjust the length of the clock switching cycles, thereby allowing a charge pump system to generate a desired output voltage. Because PWM adjusts the switching, in contrast to turning on/off the clock in the burst mode, PWM poses no inter-modulation problem. Moreover, a PWM solution provides an area-efficient solution to charge pump regulation. In one embodiment, a charge pump system can selectively operate in a PWM mode or in a variable frequency mode. In the variable frequency control, the oscillator frequency (with equal switching times) is adjusted based on load requirements. Specifically, a lighter load results in a lower frequency, whereas a heavier load results in a higher frequency.

Charge Pump System

Figure 1A:
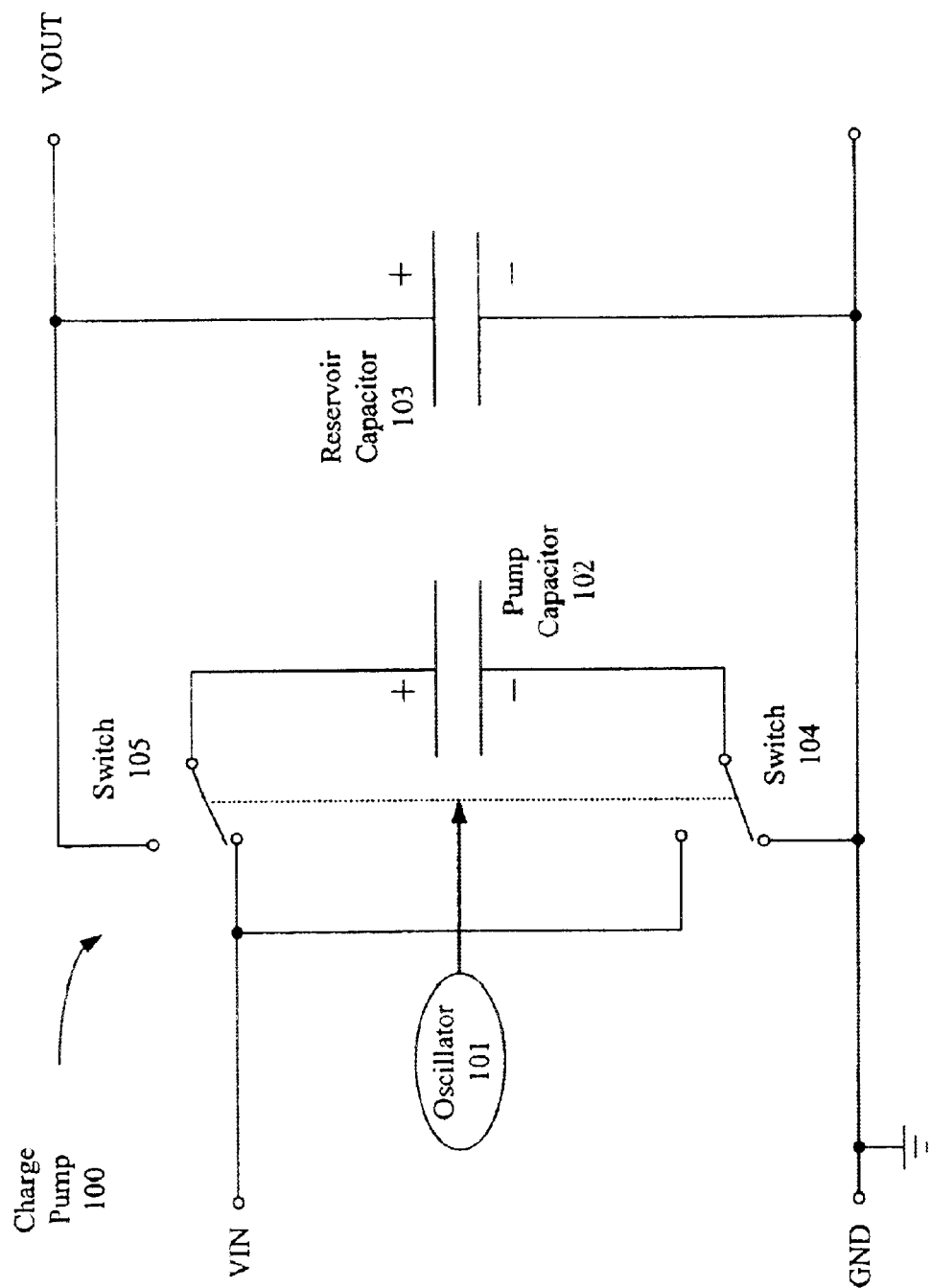
FIG. 1A illustrates a simplified charge pump.
Figure 1B:
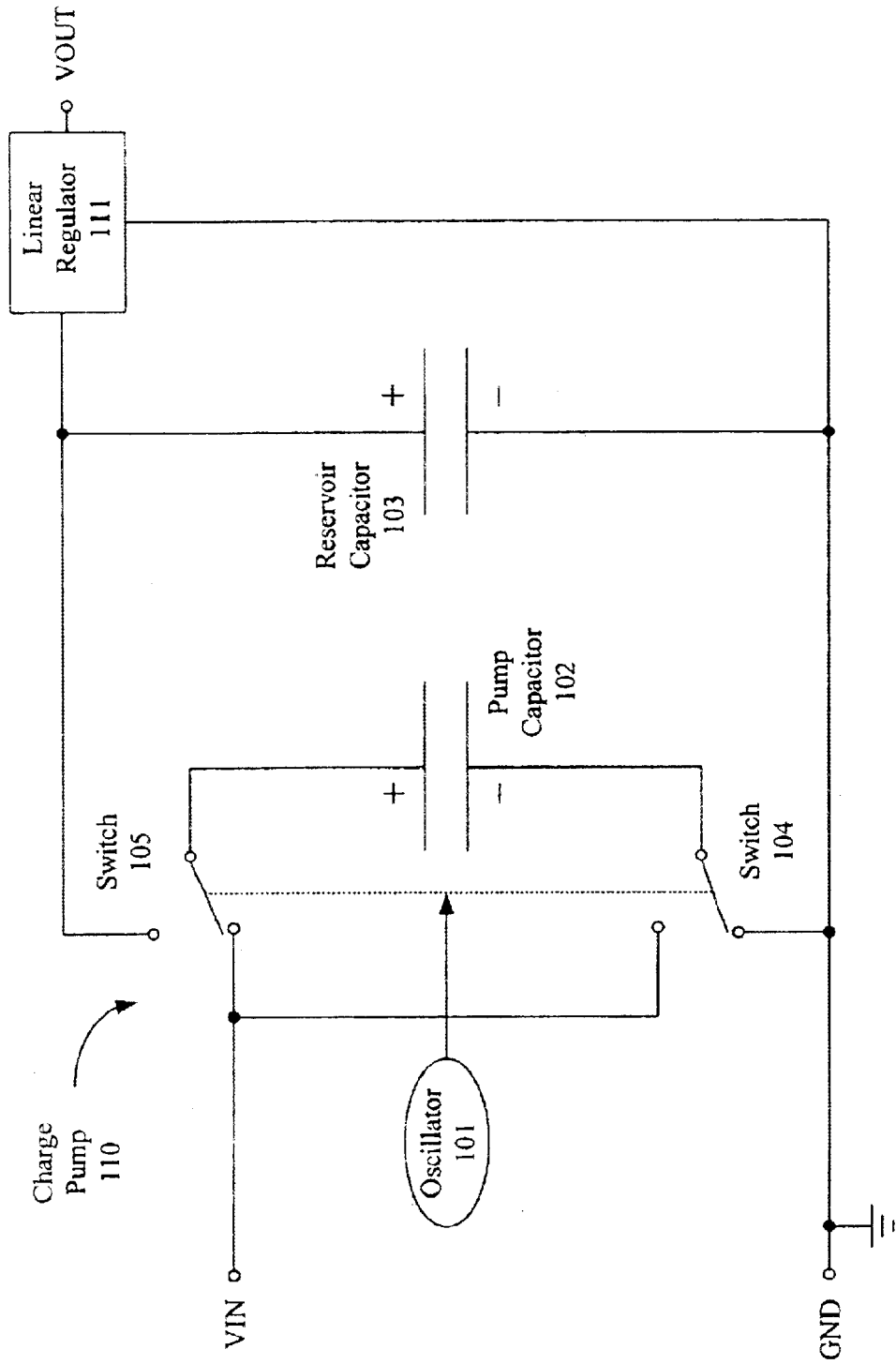
FIG. 1B illustrates a modified charge pump including a linear regulator.
Figure 2:
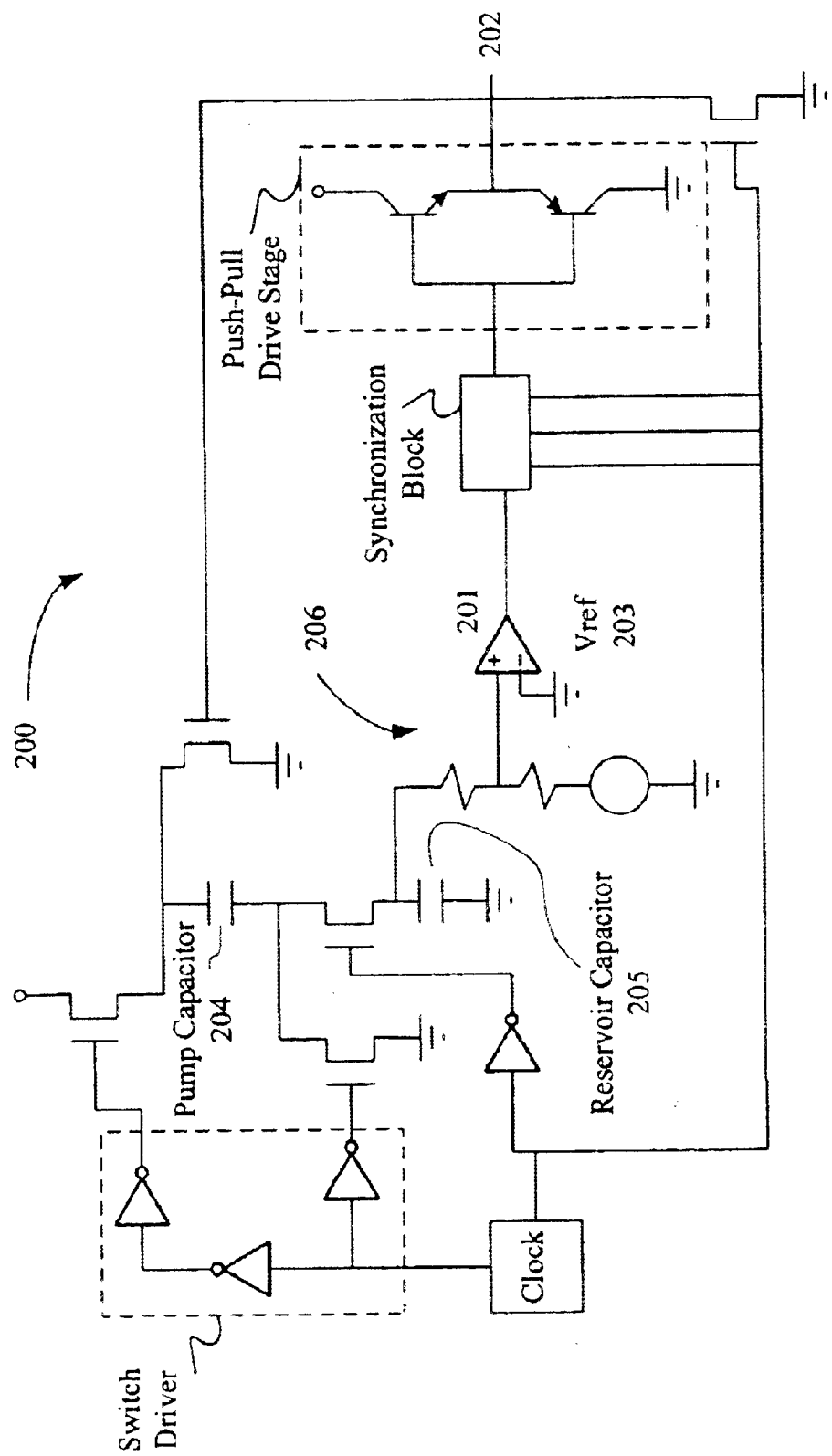
FIG. 2 illustrates describes one example of a continuously modulating regulator that includes a comparator for responding to the difference between the output voltage of a charge pump and a reference voltage.
Figure 3:
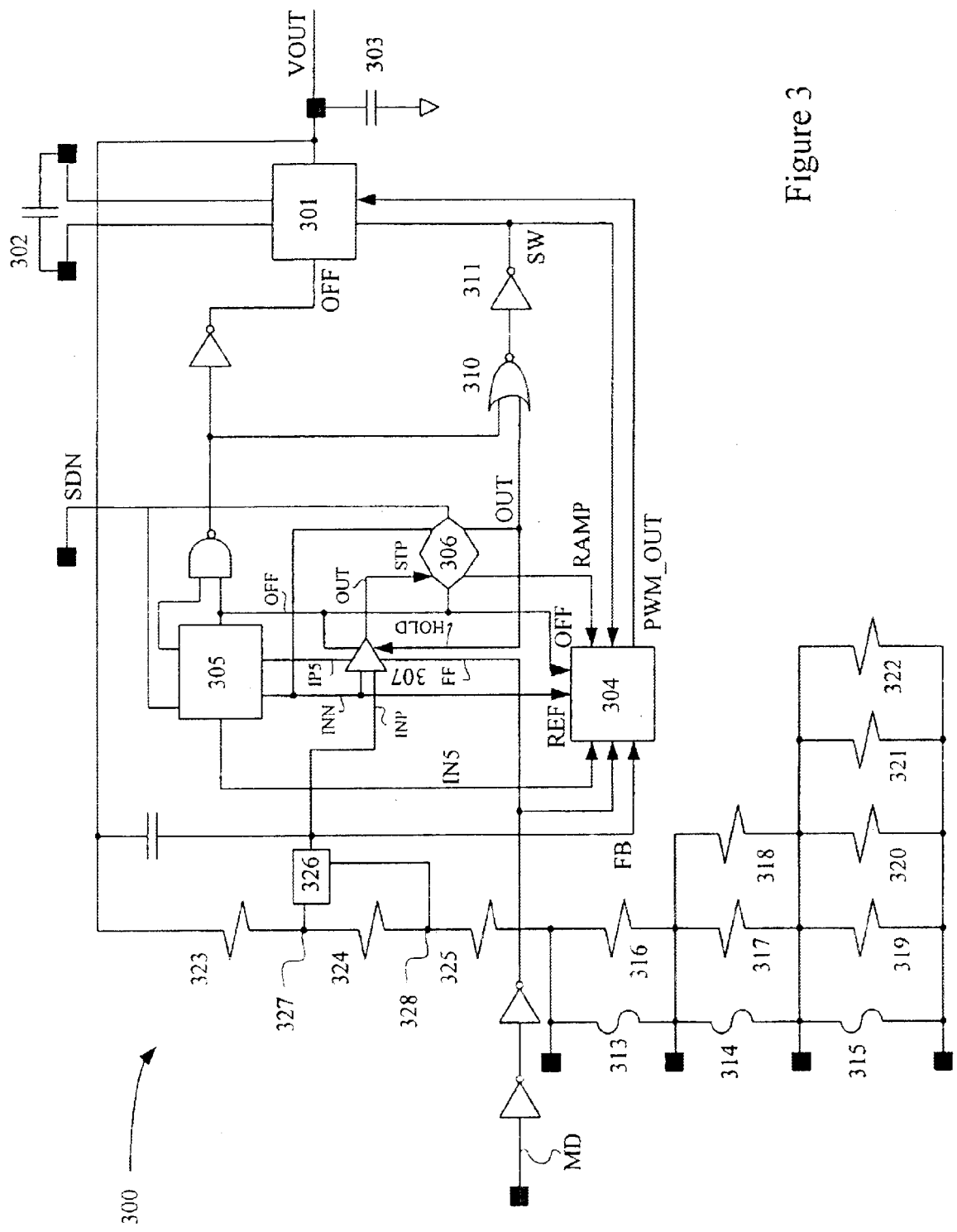
FIG. 3 illustrates a charge pump system in accordance with one embodiment of the invention.

FIG. 3 illustrates a simplified schematic of a charge pump system 300 that includes a regulated charge pump 301, a pulse width modulated (PWM) controller 304, a band gap reference voltage generator 305, and a clock circuit 306. A pump capacitor 302 and a reservoir capacitor 303, which could be located either on or off chip, are coupled operatively to charge pump system 300. In this embodiment, a received mode signal MD determines if regulated pump system 300 operates in the pulse width modulated mode or the variable frequency mode. In one embodiment, mode signal MD could be provided by user input. In another embodiment, mode signal MD could be generated automatically by a system controller (not shown) that optimizes the operation of multiple systems including charge pump system 300.

In charge pump system 300, PWM controller 304 receives a plurality of input signals and generates an output signal PWM_OUT that controls regulated charge pump 301, thereby selectively charging capacitors 302 and 303. One of the input signals received by PWM controller 304 includes a feedback signal (FB) derived from the system output voltage (VOUT). Specifically, in this embodiment, VOUT is provided to a trimmable resistor network comprising resistors 316–325, which in turn generates the feedback signal FB. In this manner, PWM controller 304 receives a known percentage of VOUT to facilitate generating the correct output signal PWM_OUT.

In one embodiment, the resistor network comprising resistors 316–325 further includes a plurality of fuses 313–315 that can be used to finely tune the resistor network. Specifically, blowing fuse 315 adds resistors 319–322 to a group of resistors 323–325, whereas blowing fuse 314 adds resistors 317–318, and blowing fuse 313 adds resistor 316. In one implementation, each of resistors 316–322 can provide a resistance of 5 kOhm. In contrast, resistors 323–325 can provide resistances of 310 kOhm, 65 kOhm, and 120 kOhm, respectively. In one embodiment, a switching circuit 326 allows the user to select one of a plurality of voltages from nodes in the resistor network. For example, in the embodiment of FIG. 3 and using the above-described values in the resistor network, node 327 can provide 3.3V and node 328 can provide 5.0V.

Note that the feedback signal FB is also provided to one input terminal of a comparator 307. The other input terminal of comparator 307 receives a reference voltage REF generated by band gap reference voltage generator 305. In one embodiment, reference voltage REF can be 1.25V. The resistor network comprising resistors 316–325 is typically set to generate the same reference voltage based on a desired system output voltage VOUT.

Various components of charge pump system 300 and the operation of these components will now be described in further detail.

Regulated Charge Pump

Figure 4A:
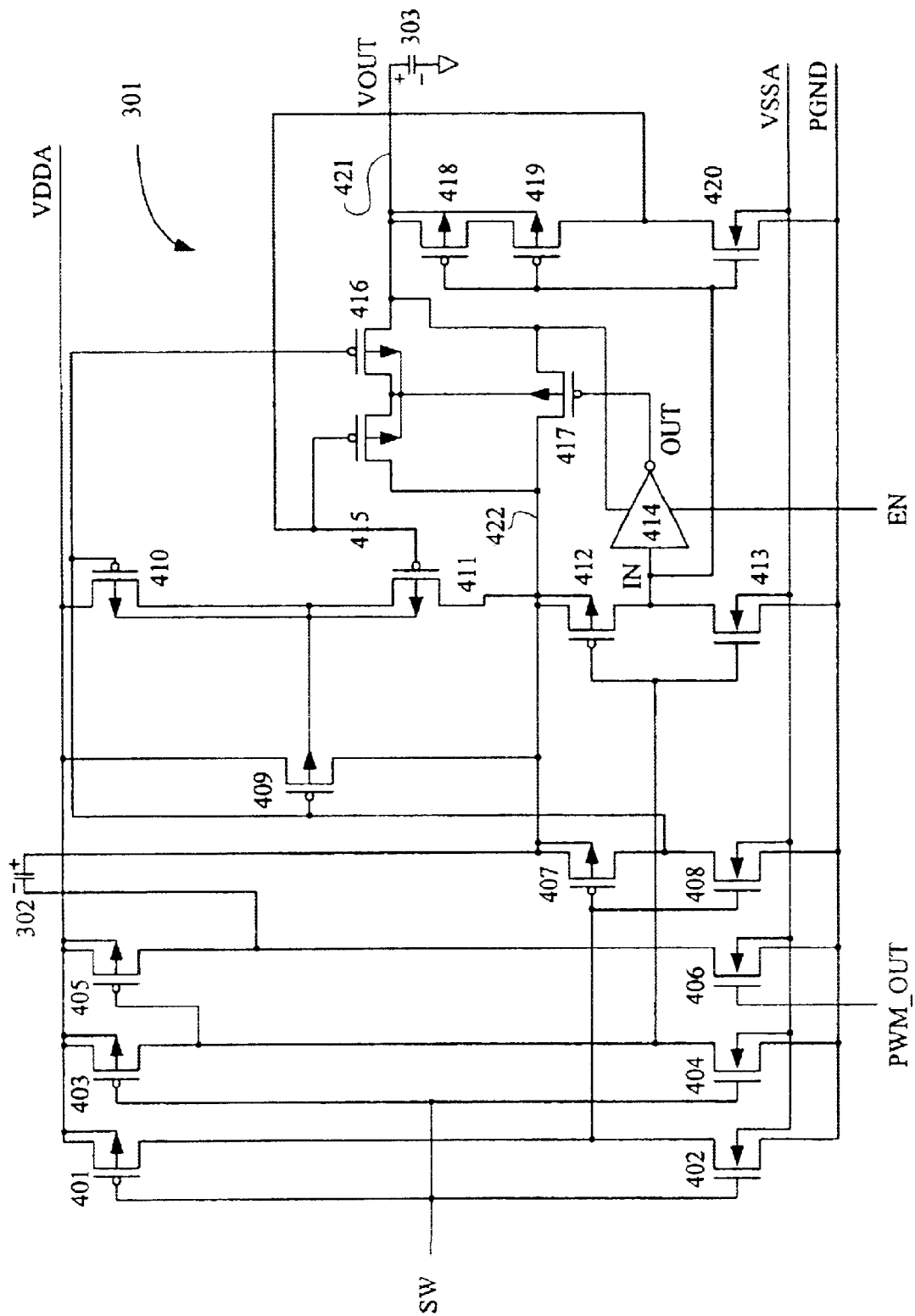
FIG. 4A illustrates an exemplary regulated charge pump controlled by a pulse width modulation signal.

FIG. 4A illustrates one embodiment of a regulated charge pump 301. Note that pump capacitor 302 and reservoir capacitor 303 are also shown in FIG. 4A to facilitate understanding of the operation of charge pump 301. Charge pump 301 has two phases: a first phase in which pumping capacitor 302 can charge to voltage VDDA and a second phase in which reservoir capacitor 303 can charge to a desired output voltage VOUT.

Charge pump 301 enters the first phase when an input switching signal SW is a logic zero. In this phase, transistors 401 and 402, which function as an inverter, are turned on and off, respectively, thereby providing a logic one signal to transistor 407 (turning off that transistor) and transistor 408 (turning on that transistor). Conducting transistor 408 provides a logic zero signal to transistors 409, 410, and 416, thereby turning on those transistors. In this first phase, transistors 403 and 404, which also function as an inverter, are turned on and off, respectively, thereby providing a logic one signal to transistor 405 (turning off that transistor), transistor 412 (turning off that transistor), and transistor 413 (turning on that transistor). Conducting transistor 413 provides a logic zero signal to tristate inverter 414, which in turn outputs a logic one signal (assuming that tristate inverter 414 is enabled, discussed in reference to FIG. 5) and turns off transistor 417.

When transistors 415 and 417 are turned off, line 421 can be isolated from the rest of regulated charge pump 301, thereby allowing VOUT to drift down to zero volts. The logic zero signal provided by conducting transistor 413 turns off transistor 420 and turns on transistors 418 and 419. Note that transistors 418–420 effectively function as an inverter, wherein transistors 418 and 419 are provided in series to handle the potentially large voltage on line 421.

In this first phase, a logic one PWM_OUT signal is provided to transistor 406, thereby turning on that transistor.

In this manner, pump capacitor 302 is coupled to voltage source VDDA through conducting transistor 409 and to voltage source PGND through conducting transistor 406. Therefore, pump capacitor 302 can charge to the voltage level provided by voltage source VDDA.

Charge pump 301 enters a second phase of operation when the input switching signal SW is a logic one. Therefore, transistors 401 and 402 are turned off and on, respectively, thereby providing a logic zero signal to transistor 407 (turning on that transistor) and transistor 408 (turning off that transistor). In this phase, transistors 403 and 404, which also function as an inverter, are turned off and on, respectively, thereby providing a logic zero signal to transistor 405 (turning on that transistor), transistor 412 (turning on that transistor), and transistor 413 (turning off that transistor). Conducting transistors 405 and 407 provide a logic one signal to transistors 409, 410, and 416, thereby turning off those transistors. Conducting transistor 412 transfers the logic one signal to tristate inverter 414, which in turn generates a logic zero output signal. This output signal turns on transistor 417. The logic one signal to tristate inverter 414 is also provided to transistor 418 (turning off that transistor), transistor 419 (turning off that transistor), and transistor 420 (turning on that transistor). Conducting transistor 420 provides a logic zero signal to transistors 411 and 415, thereby turning on those transistors. In this second phase, a logic zero PWM_OUT signal is provided to transistor 406, thereby turning off that transistor. In this manner, pump capacitor 302 is coupled to voltage source VDDA through conducting transistor 405 and to reservoir capacitor 303 through conducting transistor 417. Therefore, reservoir capacitor 303 can charge to twice the voltage level provided by voltage source VDDA.

Phase Switching of Charge Pump

If charge pump 301 were operating at maximum power, than transistor 406 would be on 50% of the time and off the other 50% of the time (i.e. providing a 50% duty cycle). In cases where maximum power is not desired, i.e. a VOUT of 2×VDDA is not desired, then the PWM_OUT signal can be selectively switched high/low to provided the desired VOUT. Specifically, in one embodiment, PWM controller 304 (FIG. 3) turns on transistor 406 during the first phase to charge capacitor 302, but only for the time period necessary to provide the desired regulated output voltage VOUT. In one embodiment, PWM controller 304 can provide a constant "off" time for transistor 406 during the second phase.

Figure 4B:
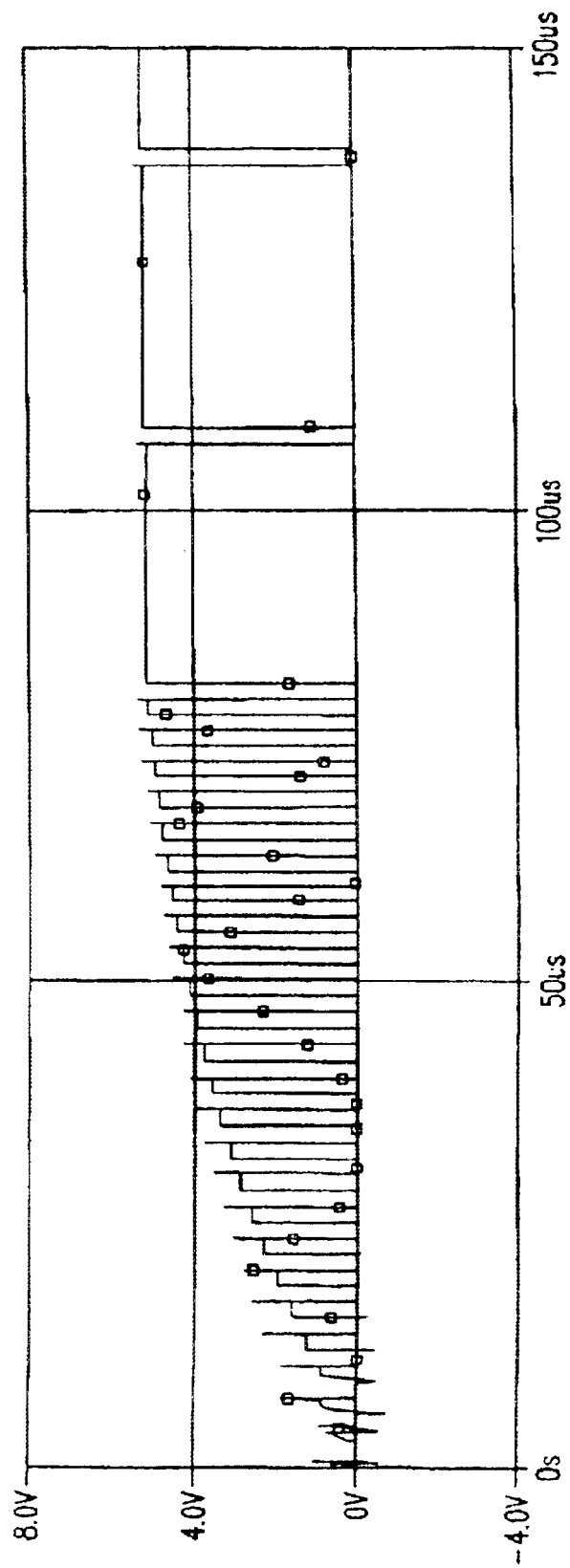
FIGS. 4B–4E illustrate timing diagrams of various signals shown in FIGS. 3 and 4A.
Figure 4C:
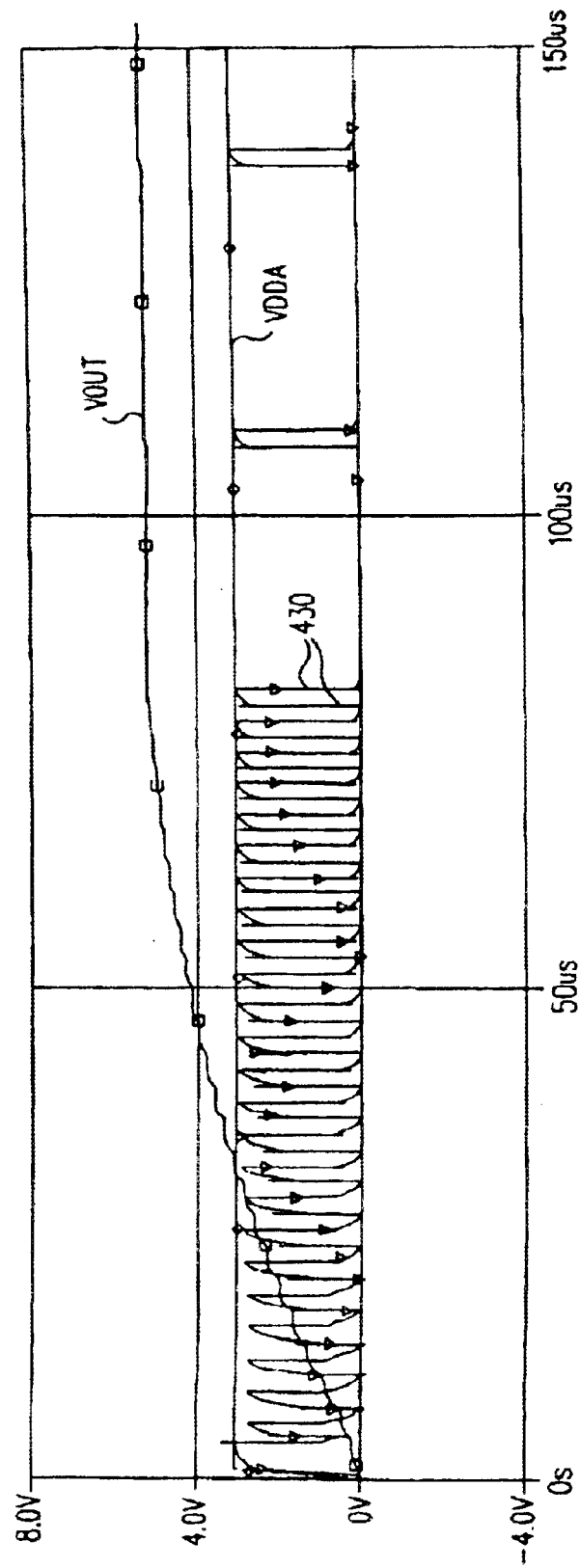
Figure 4D:
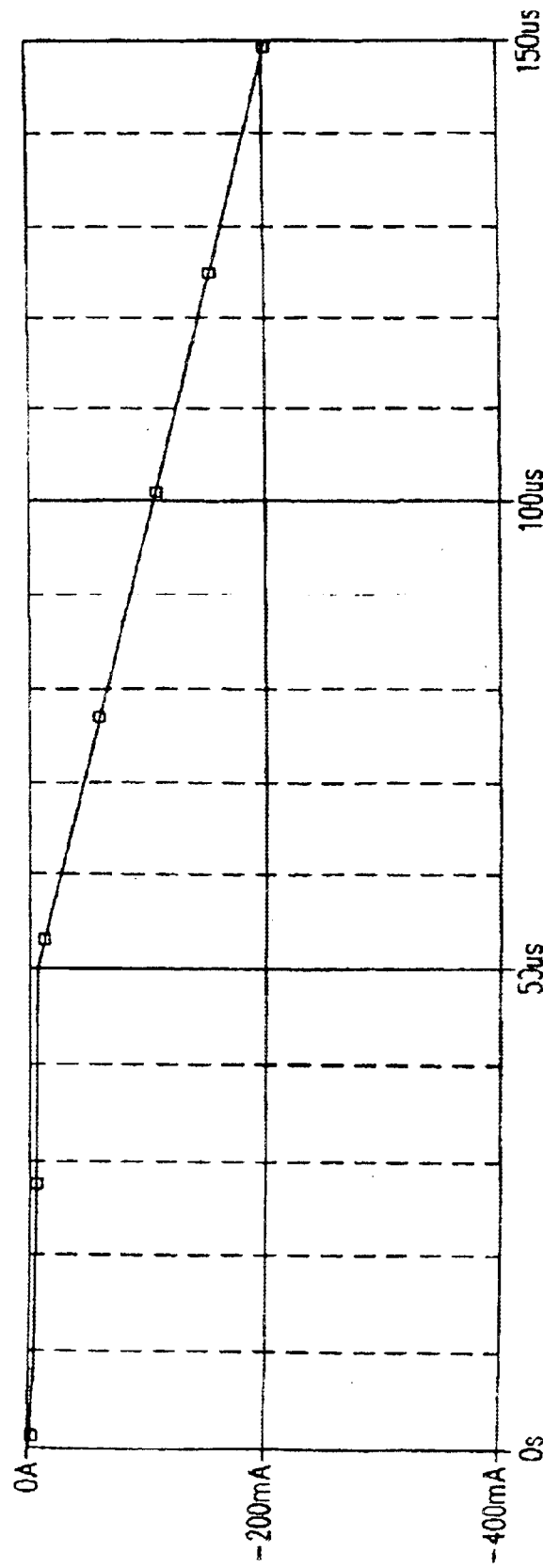
Figure 4E:
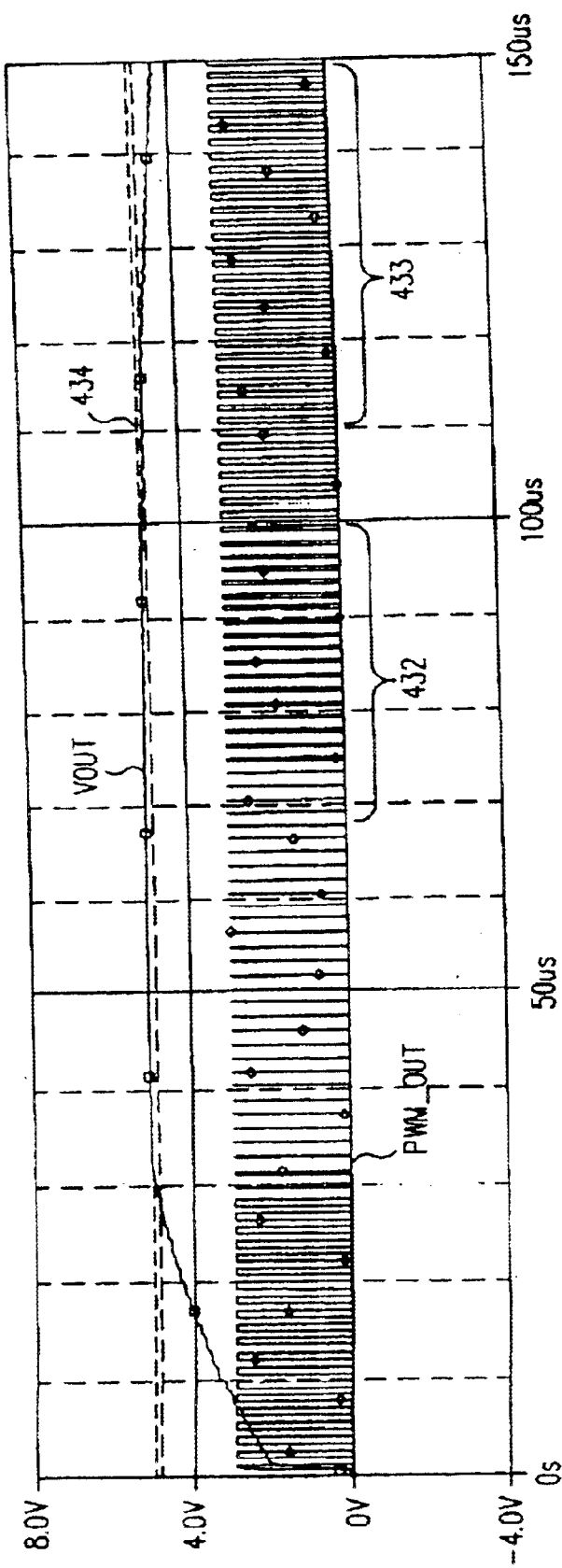

FIGS. 4B–4E illustrate timing diagrams of various signals shown in FIGS. 3 and 4A. For example, FIG. 4B illustrates a timing diagram of an output signal of tristate inverter 414. FIG. 4C illustrates a timing diagram of voltages VOUT and VDDA as well as a waveform 430 indicating the voltage behavior of the negative terminal of capacitor 302 (FIG. 3). FIG. 4D illustrates the load current provided in the PWM mode, wherein the load current is ramped from 0 to 200 mA. FIG. 4E illustrates a timing diagram of voltage VOUT and PWM_OUT during the PWM mode. In FIG. 4E, a period 432 of signal PWM_OUT indicates a light load and thus a low duty cycle, whereas a period 433 indicates a heavy load and thus a maximum duty cycle. Note that at time 434, which immediately precedes the maximum duty cycle, voltage VOUT drops out of regulation.

In accordance with one implementation, the switching signal SW is timed to change logic state substantially at the same time that the PWM signal changes logic state, thereby indicating a transition from one phase to another. However, transistors 405 and 406 can be sized to provide optimal switching from one edge to another. Specifically, in one embodiment, these transistors can be sized to provide a fast turn-off edge but a slow turn-on edge, thereby providing "break before make" switching. In other words, for example, during a transition between the first and second phases, transistor 406 turns off before transistor 405 turns on. This timing prevents inadvertent discharging of capacitor 302, which has charged to voltage VDDA during the first phase.

Isolating Circuit

In accordance with one feature of the invention, transistors 415–417 can advantageously isolate line 421 from a line 422 using both gate voltages and body biasing. Specifically, the body of transistor 417 can be selectively coupled to one of lines 421 and 422, whichever has the greater voltage thereon, thereby ensuring that transistor 417 does not conduct in the reverse manner. For example, during the first phase in which the voltage on line 421 is greater than the voltage on line 422, transistors 415 and 417 are turned off and transistor 416 is turned on, thereby isolating line 421 from line 422. In this configuration, line 421 functions as a source for transistor 417 and the voltage on line 421 biases the body of transistor 417. In contrast, during the second phase in which the voltage on line 422 is greater than the voltage on line 421, transistors 415 and 417 are turned on and transistor 416 is turned off, thereby connecting line 421 to line 422. In this configuration, line 422 functions as a source for transistor 417 and the voltage on line 422 biases the body of transistor 417. Thus, irrespective of phase, transistor 417 has a body biased by the greater of the voltages on lines 421 and 422, thereby ensuring that transistor 417 does not conduct in the reverse way.

Tristate Inverter

Figure 5:
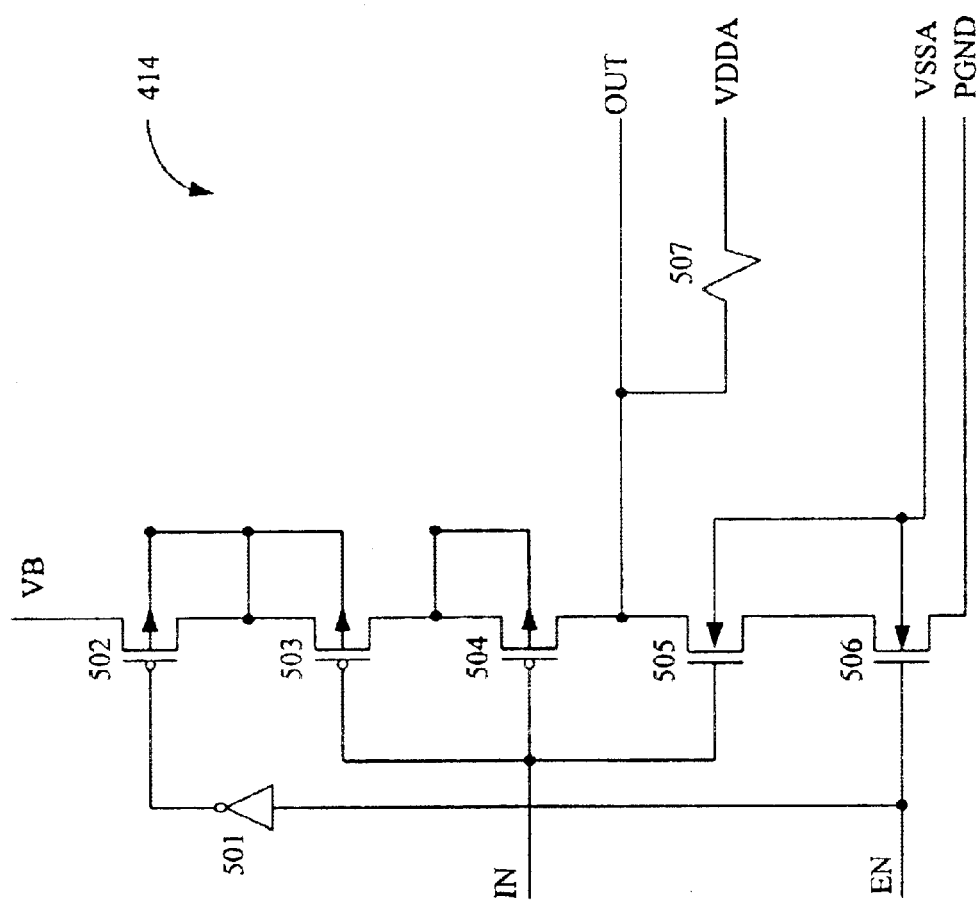
FIG. 5 illustrates an exemplary tristate driver for the regulated charge pump.

FIG. 5 illustrates one embodiment of tristate inverter 414. In this embodiment, tristate inverter 414 receives a signal OFF that enables tristate inverter 414 (in this case, a logic one) or disables tristate inverter 414 (in this case, a logic zero). If enabled, then voltages PGND and VB are provided to the circuit, thereby allowing the functioning of tristate inverter 414. If disabled, then voltages PGND and VB are not provided, thereby preventing functioning of tristate inverter 414. Specifically, a logic one enable signal EN turns on transistor 502 (via inverter 501) and transistor 506, thereby providing voltages VB and PGND to the sources of transistors 503 and 506, respectively. For simplicity, assume that both voltage VB (explained in further detail below) and the enable signal EN are logic one signals. If an input signal IN is a logic one, then transistors 502, 505, and 506 are turned on and transistors 503 and 504 are turned off. In this manner, a logic zero signal is provided as an output signal OUT via conducting transistors 505 and 506. In contrast, if an input signal IN is a logic zero, then transistors 502, 505, and 506 are turned off and transitors 503 and 504 are turned on. In this manner, a logic one signal is provided as the output signal OUT via conducting transistors 503 and 504. Note that resistor 507 is a pull-up transistor that allows the output signal OUT to go high when the input signal IN is high and input signal OFF is low.

PWM Controller

Figure 6A:
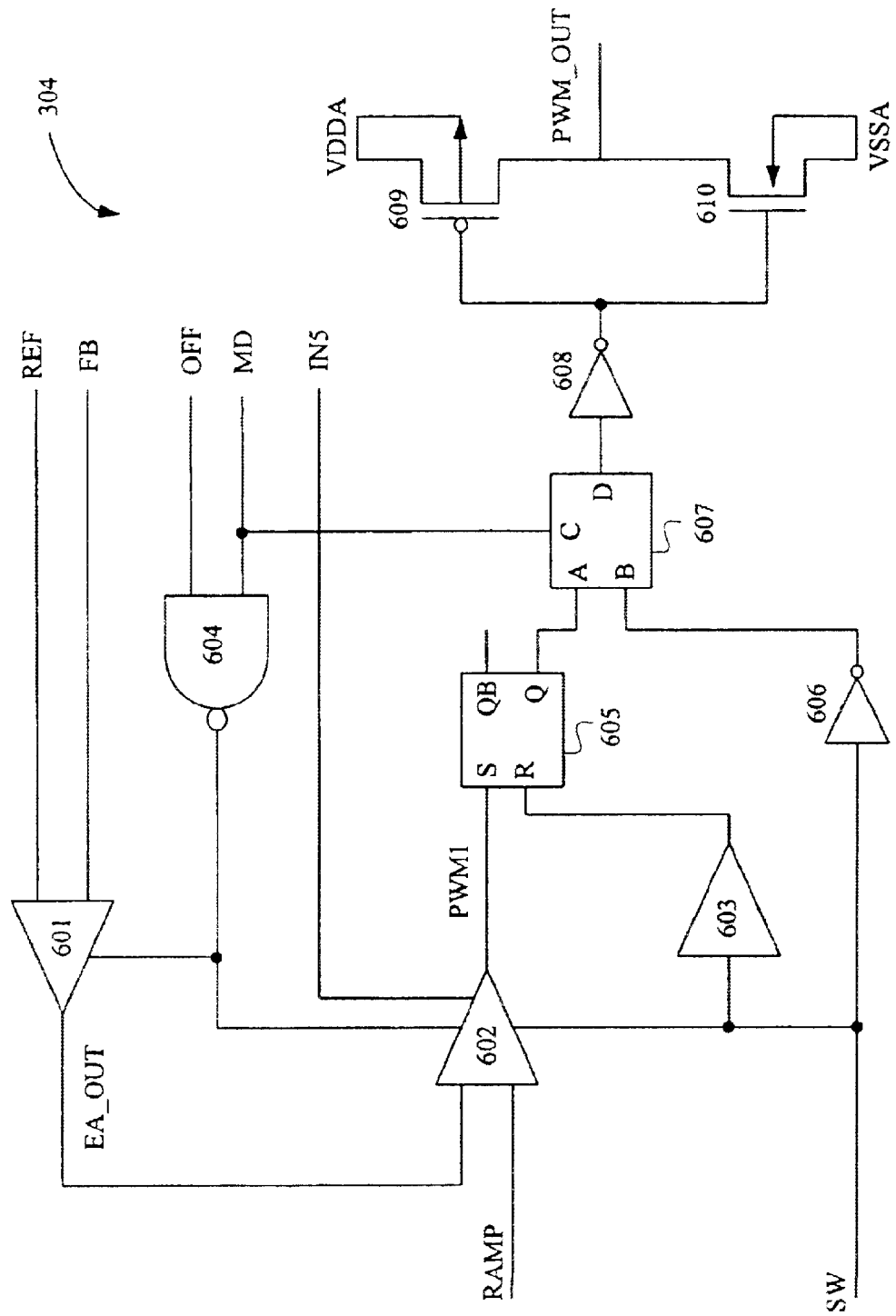
FIG. 6A illustrates an exemplary PWM control circuit for the charge pump system.

FIG. 6A illustrates a simplified schematic of one embodiment of PWM controller 304. In this embodiment, PWM controller 304 includes an error amplifier 601 that amplifies any difference between the reference voltage REF (generated by band gap reference voltage generator 305) and the feedback signal FB (generated by the resistor network comprising resistors 316–325). The amplified error output signal EA_OUT is then provided, along with a RAMP signal, to a comparator 602, which generates a pulse width modulated signal PWM1.

This PWM1 signal is provided to an input terminal S of a S-R latch 605. Thus, the PWM1 signal acts as the "set" signal of S-R latch 605. The switching signal SW is buffered by a buffer 603 and then provided to an input terminal R of S-R latch 605.

If the PWM1 signal is a logic one and the switching signal SW is a logic zero, then S-R latch 605 is set to output a logic one output signal Q. On the other hand, if the PWM1 signal is a logic zero and the SW signal is a logic one, then S-R latch 605 is reset to output a logic zero output signal Q. If both the PWM1 and SW signals are logic zero, then the last Q output signal is retained. However, if both the PWM1 and SW signals are logic one, then S-R latch 605 is forced to output a logic zero output signal Q.

In this embodiment, the Q output signal of S-R latch 605 can be provided to a multiplexer 607, which selectively determines if the Q output signal or the switching signal SW (inverted by an inverter 606) to provided to a buffer (comprising a first inverter 608 and a second inverter including transistors 609 and 610). Note that multiplexer 607 is controlled by the mode signal MD. As described previously, the mode signal MD determines whether charge pump system 301 operates in the pulse-width-modulation mode or the variable frequency mode. In the PWM mode, multiplexer 607 selects the PWM1 signal at its A terminal, whereas in the variable frequency mode, multiplexer 607 selects the inverted (see inverter 606) switching signal SW/ at its B terminal.

In this embodiment of PWM controller 304, a NAND gate 604 receives the mode signal MD and an OFF signal (provided by clock circuit 306). Either one of the mode signal MD or the OFF signal can disable error amplifier 601 and comparator 602. In this embodiment, the disabling input is a logic zero signal, thereby forming a logic one at the output terminal of NAND gate 604. A logic zero mode signal MD provided to the control terminal C of multiplexer 607 selects the inverted switching signal SW(bar)/.

Figure 6B:
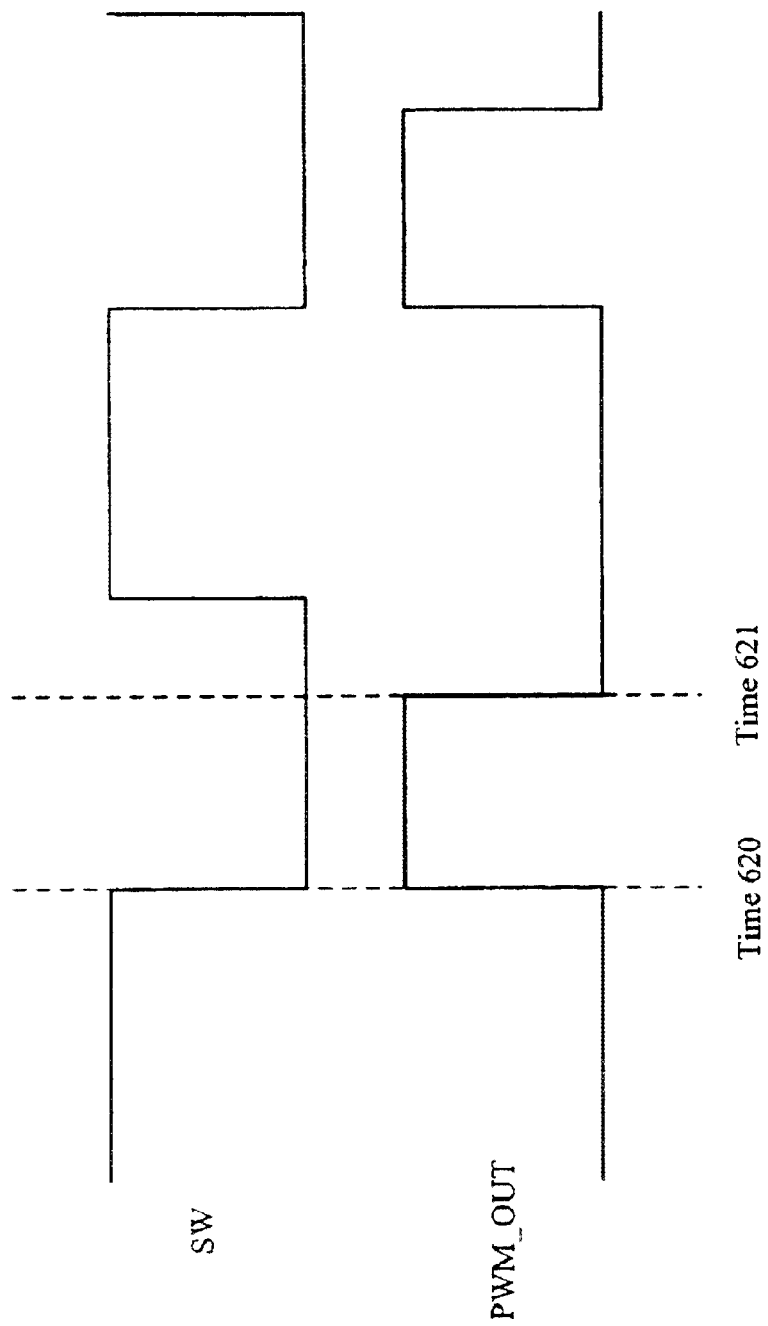
FIG. 6B illustrates a timing diagram showing a basic relationship between the switching signal SW and the pulse-width modulated signal PWM_OUT.

In one embodiment, at the start of each new clock cycle in the first phase, transistors 406 and 409 (FIG. 4A) are turned on at the same time. Based on the reference voltage RF and the feedback signal FB, error amplifier 601 (FIG. 6A) indicates when to turn off transistor 406. Specifically, transistor 406 is turned off in advance of transistor 409, thereby controlling the amount of charge placed on capacitor 302. Thus, in accordance with one feature of the invention, capacitor 302 is not fully charged. FIG. 6B illustrates a timing diagram showing a basic relationship between the switching signal SW and the pulse-width modulated signal PWM_OUT. In this embodiment, at time 620, the trailing edge of the switching signal SW (thus transistor 409 is "ON") triggers the leading edge of signal PWM_OUT. Note that from time 620 to time 621, capacitor 302 is charging. Thus, for light loads, signal PWM_OUT has a shorter "ON" time because less charge is required to maintain the desired output voltage.

Figure 6C:
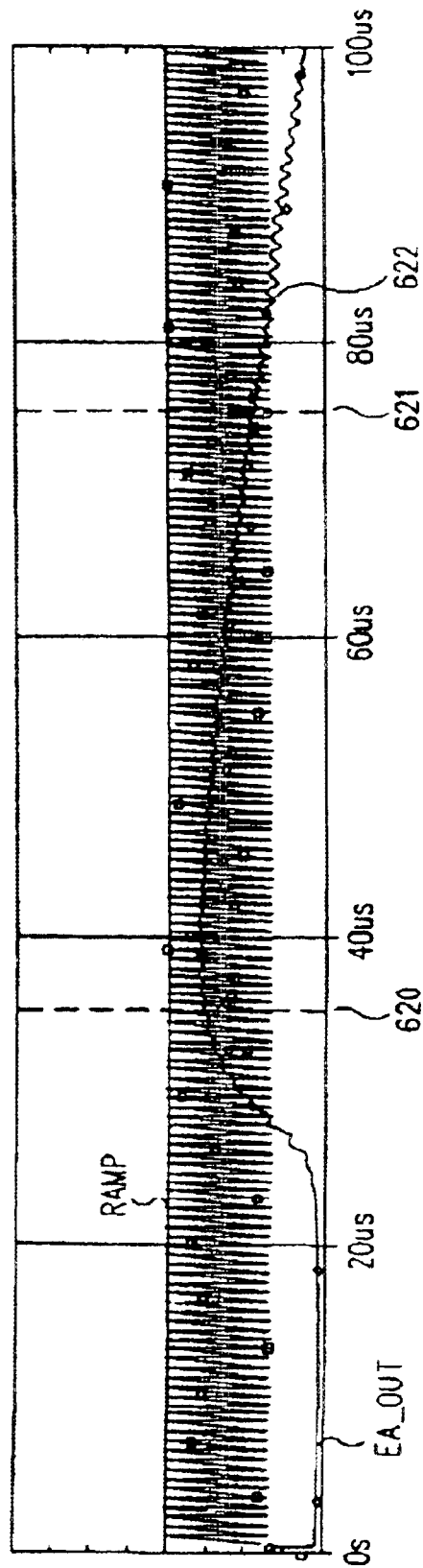
FIGS. 6C–6E illustrate timing diagrams of various signals of FIGS. 3 and 6A.
Figure 6D:
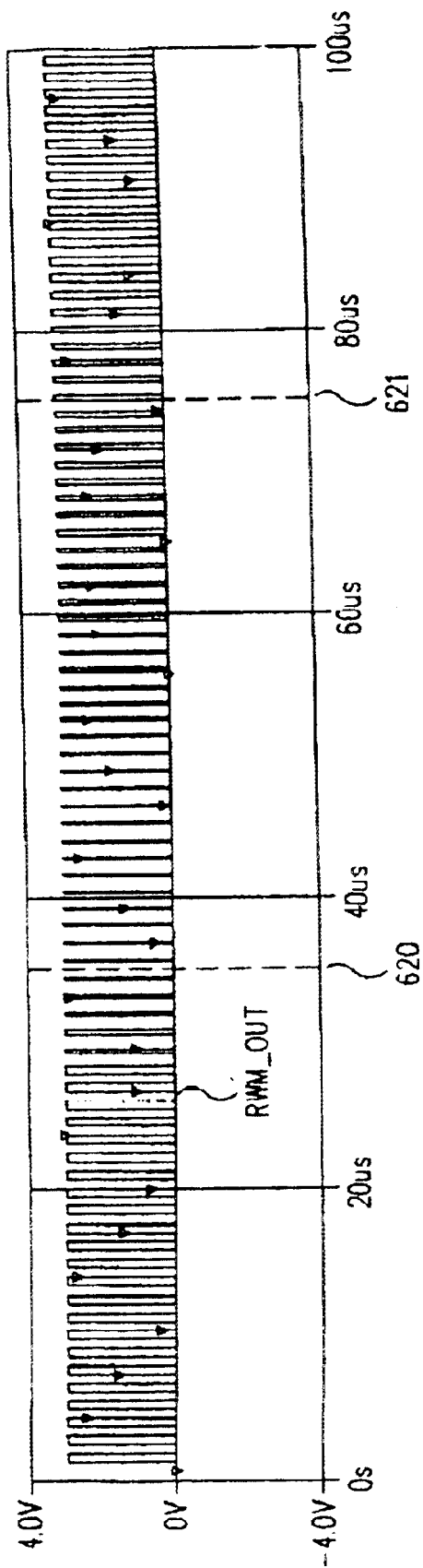
Figure 6E:
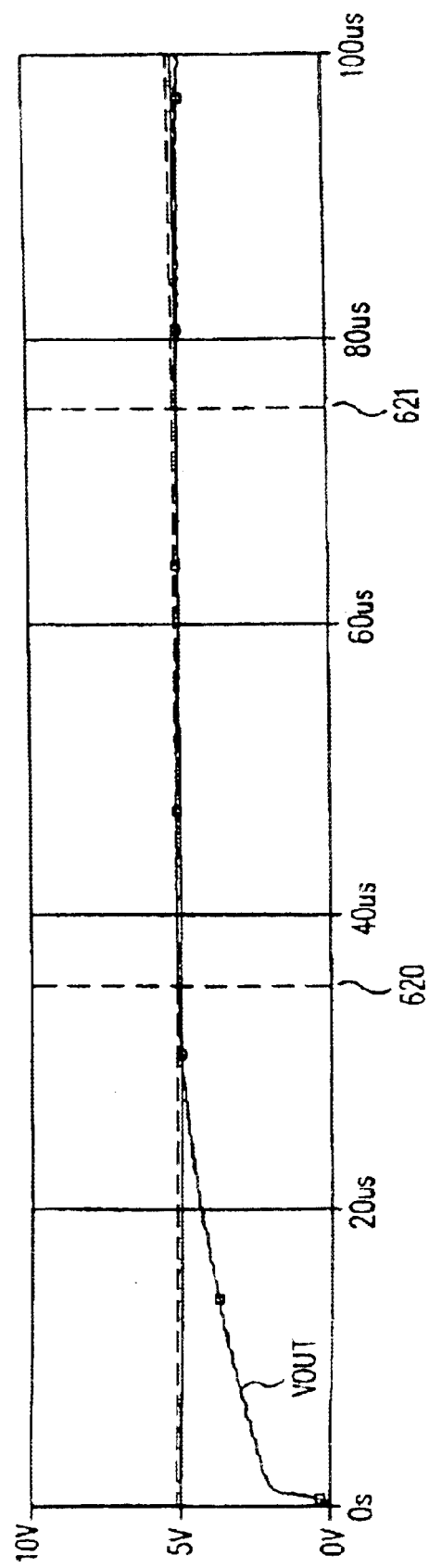

FIG. 6C illustrates a timing diagram showing signals RAMP and EA_OUT during the PWM mode and assuming a VIN of 3.0 V. Note that signal EA_OUT drops out of regulation at time 622. FIG. 6D illustrates a timing diagram showing signal PWM_OUT during the PWM mode. Times 620 and 621 correspond respectively to when signal EA_OUT first reaches its maximum value and then nears its regulation limit. FIG. 6E illustrates a timing diagram showing voltage VOUT, wherein the change of voltage between times 620 and 621 is approximately 151 mV.

Clock Circuit

Referring to FIG. 3, clock circuit 306 generates an output signal OUT that is provided to a first input terminal of NOR gate 310. Assuming the second input terminal of NOR gate 310 receives a logic zero signal, NOR gate 310 functions as an inverter. Thus, under this condition, NOR gate 310 and inverter 311 buffer signal OUT, which is then provided to regulated charge pump 301 and PWM controller 304 as switching signal SW. On the other hand, if the second input terminal of NOR gate 310 receives a logic one signal, then the switching signal SW is a logic one signal, irrespective of signal OUT.

In this embodiment, clock circuit 306 can receive a shut-down signal SDN for charge pump system 300. Typically, the shut-down signal SDN is provided by a user. However, the shut-down signal SDN can also be provided automatically by a system signal that is monitoring various systems including charge pump system 300.

Figure 7A:
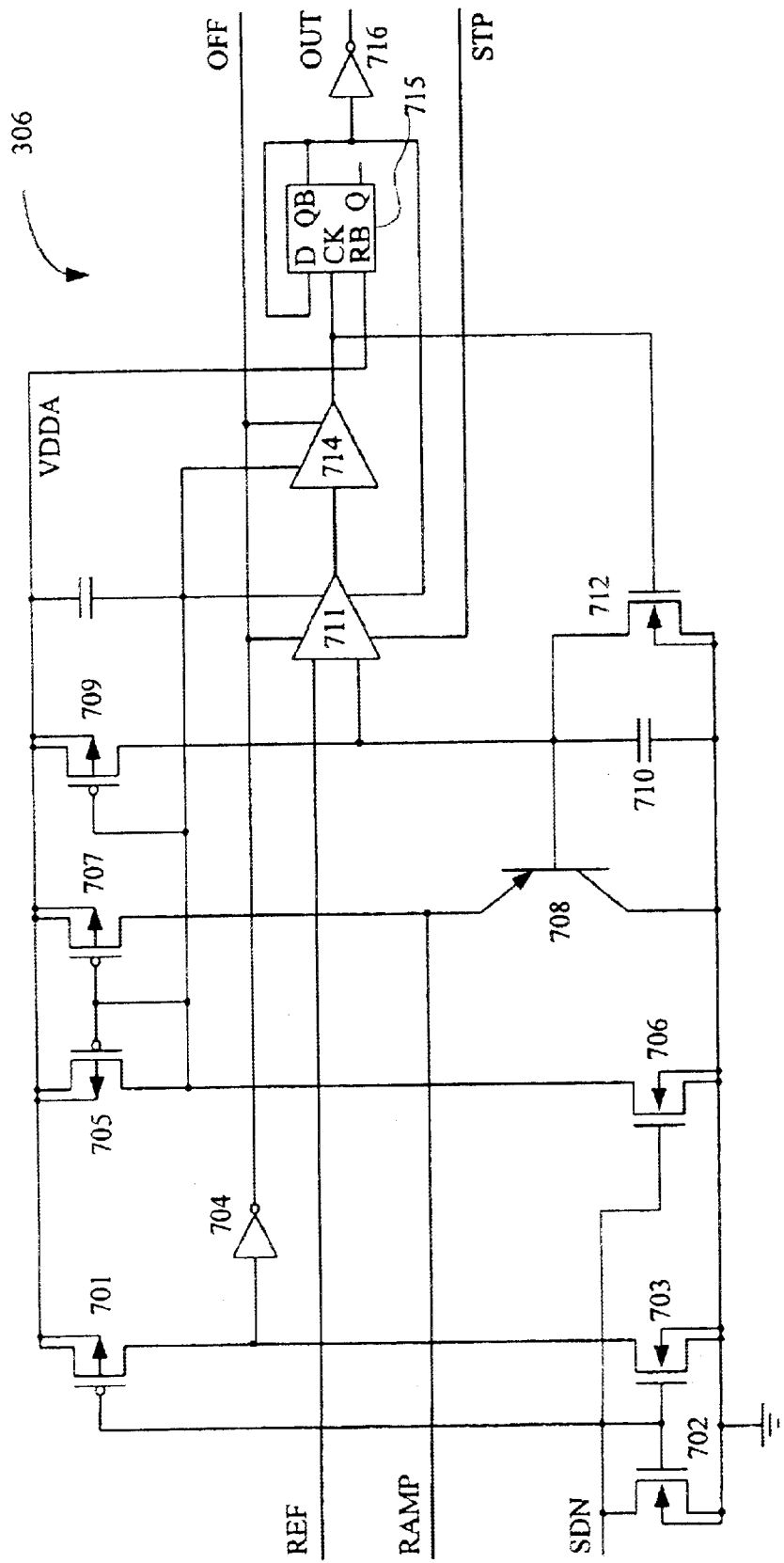
FIG. 7A illustrates an exemplary clock circuit for the charge pump system.

FIG. 7A illustrates one embodiment of clock circuit 306. In this embodiment, a logic zero shut-down signal SDN triggers the shut-down of the charge pump system. Specifically, the logic zero shut-down signal SDN turns off transistors 702, 703, and 706, but turns on transistor 701, thereby providing voltage VDDA to inverter 704. Inverter 704 outputs the previously described logic zero OFF signal that can disable error amplifier 601 and comparator 602 of PWM controller 304 (FIG. 6A). Note that the logic low OFF signal also disables a comparator 711 and a delay down circuit 714.

In contrast, if a logic one shut-down signal SDN is provided, then transistors 702, 703, and 706 are turned on, whereas transistor 701 is turned off. In this configuration, a logic zero signal is provided (via conducting transistor 703) to inverter 704, which in turn outputs a logic one (enabling) signal to comparator 711, delay down circuit 714, error amplifier 601 and comparator 602. A logic zero signal is also provided (via conducting transistor 706) to the gates of transistors 705, 707, and 709, thereby turning on those transistors. Transistor 705, with its source coupled to voltage VDDA and its drain coupled to its gate, is weakly conducting. Transistors 707 and 709, with their sources coupled to voltage VDDA and gates coupled to the drain of transistor 705, also provide a weak pull-up.

Clock circuit 306 can be free running in the PWM mode, but can be gated in the variable frequency mode. Specifically, in the variable frequency mode, it has a constant ON time, but the OFF time is controlled by the feedback signal FB. Specifically, the ON time is just enough to charge capacitor 302, then is turned OFF until the output voltage VOUT drops below the reference voltage REF. At this point, another pulse is applied.

To get a controlled pulse, an internal capacitor 710 is initially discharged to zero volts. Then, a constant current is provided to capacitor 710 via conducting transistors 705, 707, and 709 (which form a current mirror), thereby causing capacitor 710 to ramp up at a constant speed. When capacitor 710 achieves the same voltage as the reference voltage REF (e.g. 1.2 V), then comparator 711 outputs a logic zero output signal to delay down circuit 714. At that point, the signal propagates through delay down circuit 714 (which inverts the signal) and turns on transistor 712 (which also turns on a PNP transistor 708), thereby discharging capacitor 710. Advantageously, delay down circuit 714 slightly delays the output of comparator 711, thereby ensuring a minimum pulse width to transistor 712, which in turn completely discharges capacitor 710. After a predetermined discharge of capacitor 710, comparator 711 switches state and outputs a logic one output signal.

Figure 7C:
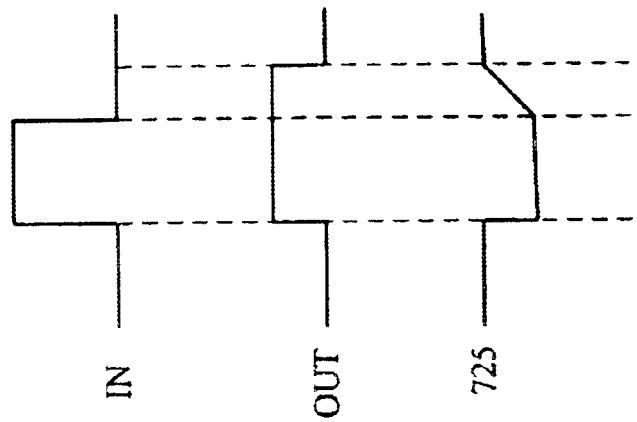
FIG. 7C illustrates a timing diagram for several signals of the delay down circuit.
Figure 7B:
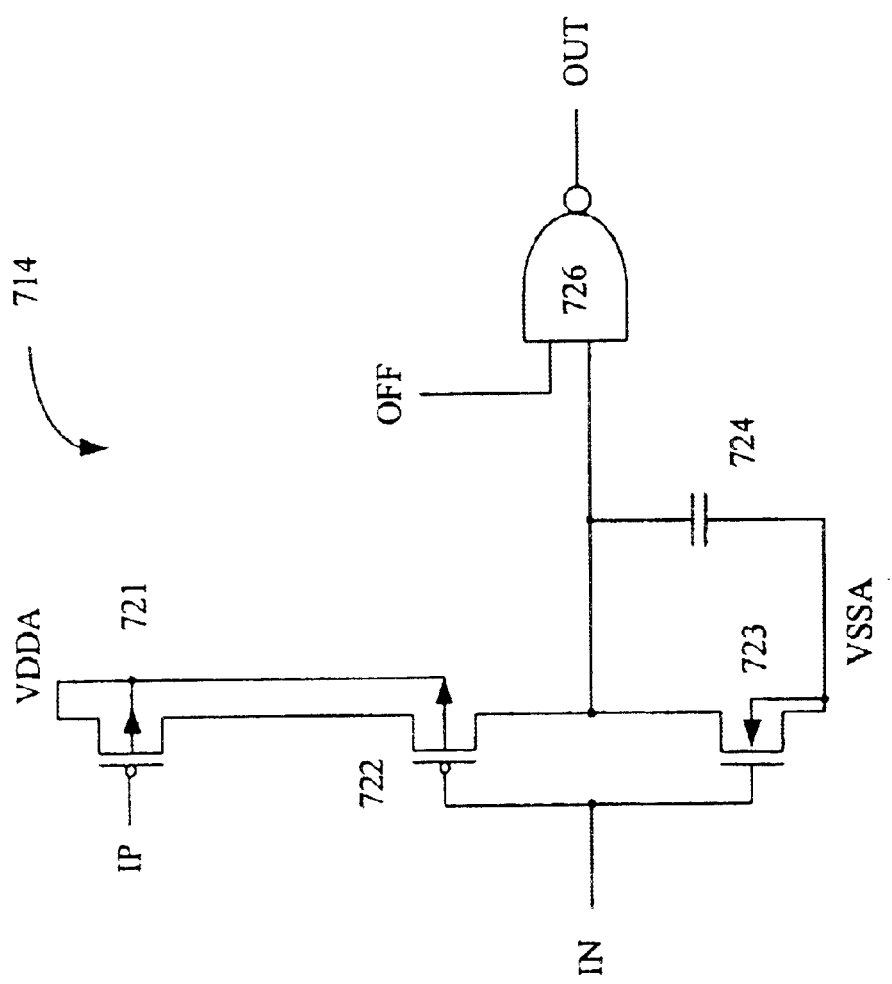
FIG. 7B illustrates one embodiment for a delay down circuit.

FIG. 7B illustrates one embodiment for delay down circuit 714. In this embodiment, transistor 721 provides a weak pull-up (wherein signal IP is relatively low, thereby weakly turning on transistor 721 to provide an oblique current to the positive supply) whereas transistors 722 and 723 respond in an inverter-like manner to the input signals IN. Capacitor 724 generates a ramp signal, see ramp signal 725 in FIG. 7C, which is provided as one input signal to a NAND gate 726. NAND gate 726 receives another input signal OFF, which determines whether delay down circuit 714 is active (in this case, high is active).

Figure 8:
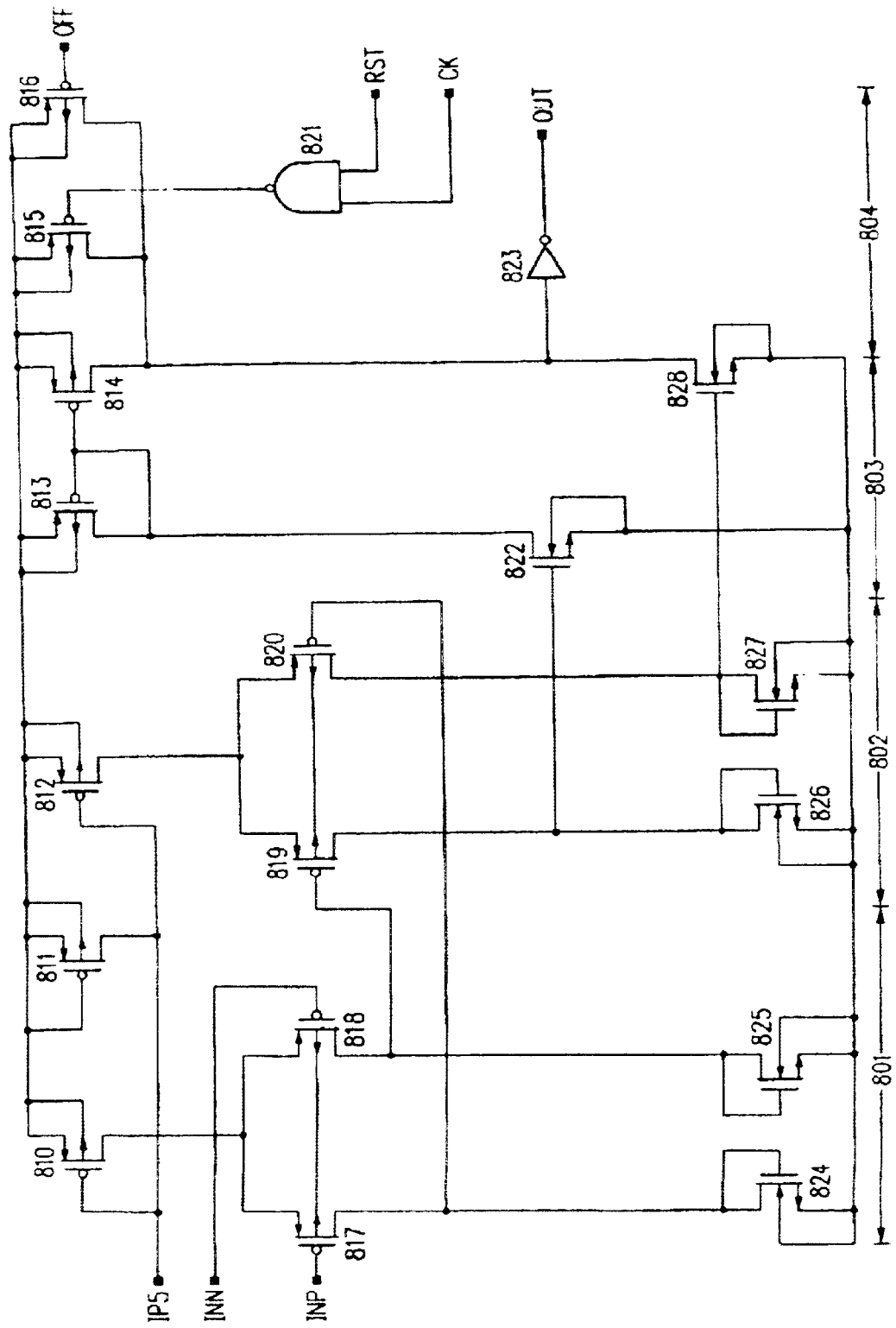
FIG. 8 illustrates an exemplary comparator having four stages.

FIG. 8 illustrates an exemplary comparator for implementing comparator 711. To increase switching speed, instead of providing one stage with significant gain, multiple stages with relatively little gain can be connected, thereby effectively multiplying the gain from each stage. In this embodiment, the comparator can include four stages 801 (including transistors 810, 811, 817, 818, 824, and 825), 802 (including transistors 812, 819, 820, 826, and 827), 803 (including transistors 813, 814, 822, and 828), and 804 (including transistors 815, 816, NAND gate 821, and inverter 823), wherein each stage can provide a predetermined gain (e.g. 5). In this configuration, the output of the comparator can approximate a high gain (e.g. 1000). At this point, the output can be level shifted using a differential to single-ended conversion.

Note that other comparator configurations can also be used to implement comparator 711. These configurations should preferably include a high input impedance, a reset function, and a strobe function that can be set with either a clock or reset signal.

Referring back to FIG. 7A, a flip-flop 715 has its D input terminal connected to its QB output terminal, thereby providing a divide-by-two operation. In other words, flip-flop 715 is constantly outputting a series of 1-0-1-0 etc. Thus, flip-flop 715 functions essentially as a toggle flip-flop, wherein for each leading edge provided on its clock terminal CK a toggle signal is provided on its output terminal QB. This toggle signal is a square wave, but at half frequency of the signal on the clock terminal CK. After being buffered by inverter 716, the toggle signal OUT drives other circuits in charge pump system as switching signal SW. Note that clock circuit 306 also generates a ramping signal RAMP for PWM controller 304.

Note that comparator 711 can be controlled by a stop signal STP. This stop signal STP can be generated by a comparator 307 (see FIG. 3). In one embodiment, comparator 307 is used in variable frequency mode, but not the PWM mode. Specifically, in the PWM mode, the clock is running continuously, thereby rendering comparator 307 unnecessary. However, in the variable frequency mode, the feedback signal FB is compared to a reference voltage to determine when to transfer more charge.

Comparator 307 can be implemented with a comparator similar to that shown in FIG. 8. In one embodiment, comparator 307 can be implemented in five (instead of four) stages and have three (instead of two) control inputs. Comparator 307 can also include a high input impedance, a reset function (using OFF or HOLD), and a strobe function that can be set with either a clock or reset signal.

Although illustrative embodiments of the invention have been described in detail herein with reference to the figures, it is to be understood that the invention is not limited to those precise embodiments. They are not intended to be exhaustive or to limit the invention to the precise forms disclosed. As such, many modifications and variations will be apparent. For example, a regulated PWM charge pump can be provided in which the input voltage is positive and the output voltage is negative as well as regulated. Note that the sizes of transistors/components in the figures can be varied to provide the operation characteristics desired by the user. Accordingly, it is intended that the scope of the invention be defined by the following claims and their equivalents.

What is claimed is:

1. A charge pump system comprising:
   a charge pump including:
      a pump capacitor;
      a reservoir capacitor;
      pump circuitry for coupling the pump capacitor between
   a first supply voltage and a second supply voltage during a first phase, and coupling the pump capacitor and the reservoir capacitor in series between the first supply voltage and an output terminal of the charge pump system during a second phase; and
   a pulse width modulated (PWM) controller coupled to the pump circuitry, wherein an output of the PWM controller determines the phase of the charge pump.

2. The charge pump system of claim 1, wherein the pump circuitry includes a feedback loop to the PWM controller, and the PWM controller includes an error amplifier that compares a voltage on the feedback loop to a reference voltage.

3. The charge pump system of claim 2, wherein the PWM controller further includes a comparator for receiving an output of the error amplifier and a ramping signal, thereby generating a PWM signal.

4. The charge pump system of claim 3, wherein the PWM controller further including a multiplexing circuit for selecting one of the PWM signal and a switching signal.

5. The charge pump system of claim 1, wherein an output of the PWM controller determines a first time associated with the first phase and a second time associated with the second phase.

6. The charge pump system of claim 1, wherein the charge pump provides "break before make" switching, thereby preventing inadvertent discharge of the pump capacitor in the first phase.

7. A method of generating a desired voltage from a charge pump, the method comprising:
   coupling a pump capacitor between a first supply voltage and a second supply voltage during a first phase;
   coupling the pump capacitor and a reservoir capacitor in series between the first supply voltage and an output terminal of the charge pump system during a second phase; and
   controlling the phase of the charge pump using a pulse width modulated (PWM) signal, thereby generating the desired voltage.

8. The method of claim 7, wherein controlling the phase includes comparing an output voltage of the charge pump with a reference voltage to generate an error signal.

9. The method of claim 8, wherein controlling the phase further includes comparing the error signal with a ramping signal to generate a PWM signal.

10. The method of claim 9, wherein controlling the phase further including selecting one of the PWM signal and a switching signal.

11. The method of claim 7, further including determining a first time associated with the first phase and a second time associated with the second phase, wherein the first time is different than the second time.

12. The method of claim 7, further including providing "break before make" switching, thereby preventing inadvertent discharge of the pump capacitor in the first phase.

13. A circuit for selectively isolating a first line from a second line, the circuit comprising:
- a first transistor having a first control terminal, a first current-carrying terminal, a second current-carrying terminal, and a first body, wherein the first and second current-carrying terminals function interchangeably as a first source and a first drain;
- a second transistor having a second control terminal, a second source, a second drain, and a second body, wherein the second source is connected to the first current-carrying terminal and the first line;
- a third transistor having a third control terminal, a third current-carrying terminal, a third current-carrying terminal, and a third body, wherein the third source is connected to the second current-carrying terminal and the second line, the third drain is connected to the second drain, and the first, second, and third bodies are connected to the second drain; and
- control circuitry coupled to the first, second, and third control terminals,
  - wherein during a first phase in which a first voltage on the first line is greater than a second voltage on the second line, the first and third transistors are turned off, the second transistor is turned on, and the first current-carrying terminal functions as a source, and
  - wherein during a second phase in which the second voltage on the second line is greater than the first voltage on the first line, the first and third transistors are turned on, the second transistor is turned off, and the second current-carrying terminal functions as a source.

14. A method of selectively isolating a first line from a second line, the method comprising:
- connecting a transistor between the first and second lines; and
- selectively coupling a body of the transistor to one of the first and second lines, whichever has the greater voltage thereon.

15. The method of claim 14, wherein if the transistor is non-conducting and a first voltage on the first line is greater than a second voltage on the second line, then coupling the body of the transistor to the first line.

16. The method of claim 14, wherein if the transistor is conducting and the second voltage on the second line is greater than the first voltage on the first line, then coupling the body of the transistor to the second line.

* * * * *